United States Patent Office

3,437,426
Patented Apr. 8, 1969

3,437,426
METHOD OF REMOVING OXYGEN FROM A CONFINED ZONE AND CATALYST THEREFOR
Camilo Quesada, Park Ridge, Ill., assignor to Universal Oil Products Company, Des Plaines, Ill., a corporation of Delaware
No Drawing. Filed Aug. 12, 1965, Ser. No. 479,309
Int. Cl. C01b 23/00
U.S. Cl. 23—2           5 Claims

ABSTRACT OF THE DISCLOSURE

Oxygen is removed from confined zones by reaction with hydrogen therein by contacting the gaseous mixture with a catalyst prepared by impregnating alumina with a platinum group metal, drying the freshly prepared catalyst, and thereafter reducing the dried catalyst in the presence of a mixed gaseous stream of nitrogen and hydrazine.

---

The present invention is directed to an improved oxidation catalyst and in particular to a method for producing an active subdivided catalyst which utilizes a safe, relatively low temperature reducing step precluding the need for the presence of hydrogen.

In view of the present wide need and use of various types of oxidation catalysts, there has been rather extensive research carried out to determine not only preferred compositions, but preferred methods of preparation. For example, the importance of removing certain harmful components from automobile exhaust gases has recently been recognized. The incomplete combustion of hydrocarbon fuels by an engine results in the generation of substantial quantities of unburned hydrocarbons, carbon monoxide and other undesirable products which, as waste products, are discharged into the atmosphere through the exhaust line. These undesirable products are believed to combine with atmosphere oxygen, under the influence of sunlight, to produce what is now commonly referred to as "smog." It has been found that catalysts utilizing platinum, palladium or platinum group metals are of advantage in converters for all exhaust streams since they have an advantage in providing high activity and longer life or stability, particularly in the presence of gases from leaded fuels. Platinum containing catalysts have of course been widely used in connection with the treatment of stack gases or waste gas streams containing combustible odorous materials or volatile components. Also, in preparting so-called "oxygen scavenging catalysts" there have been catalytic composites which generally have utilized palladium as the active component to provide both long life and activity suitable for oxidizing, or combining oxygen in small quantities with hydrogen to form water, so that the oxygen is substantially eliminated from a particular zone.

Prior associated work has also found that it is preferable to effect a final reduction of a platinum or palladium containing catalyst after drying or calcining the impregnated base material, rather than carrying out any final calcination step after the impregnation. The conventional reduction operation has involved subjecting the treated and impregnated catalyst to a high temperature above about 650° F. in the presence of hydrogen for at least about a one to two hour period, but more generally to about four hours or more of treatment. Any utilization of hydrogen at a high temperature is of course a dangerous procedure which must involve care and well controlled supervision. It is also a known fact that low temperature reductions yield considerably more stable catalysts. The reason for this is that during high temperature treatments there is more metal migration or sintering of the catalyst and, further, it appears that the undesired sintering phenomenon is enhanced or influenced during reducing conditions.

It is thus a principal object of the present invention to provide an alternative lower temperature procedure for effecting the reduction of an oxidizing catalyst containing a platinum group metal as an active component.

It may be considered a further object of the present invention to provide means for eliminating the use of hydrogen, as well as a high temperature in the reducing step, by substituting the use of a nitrogen-hydrazine mixture as the reducing gas, with said gas being obtained by bubbling nitrogen through a hydrazine aqueous solution.

In a broad aspect, the present invention provides for the preparation of an oxidizing catalyst having an active component of a platinum group metal impregnated on subdivided base particles containing alumina, with the improvement comprising, effecting after the impregnation of the base a final low temperature reduction step in the presence of a mixed gaseous stream of nitrogen and hydrazine for at least about a one hour period at a temperature of at least about 240° F.

In another embodiment, the present invention provides for the preparation of an oxidizing catalyst having an active component of a platinum group metal impregnated on subdivided alumina or silica-alumina containing base particles, the improved method, which comprises, after the impregnation of the active component onto the base material and providing for the drying thereof, effecting, a relatively low temperature reduction step in the range of about 240° F. to 660° F., but preferably at 242°±5° F. (which is close to the boiling point of hydrazine) in the presence of a mixed gaseous stream obtained by bubbling nitrogen through a solution of hydrazine for at least a one hour period.

As indicated hereinbefore, there are many types of oxidizing catalysts and many uses for this general class of catalysts. In the oxygen scavenging field, there may be used to advantage a palladium containing catalyst that will in turn be placed in a manner to contact oxygen entrained with packaging of foods or other oxidizable materials so that there may be a longer "shelf life" for the packaged material. Where the oxygen can be entirely removed or combined with hydrogen within the package after the latter is sealed, there can be a substantially longer life to the packaged material, particularly in the food products field. Where palladium or platinum or other expensive activating components are utilized in the catalyst composite, then such materials will normally be utilized in small quantities which may comprise from about 0.01% to about 0.5% by weight of the catalyst composite. Slightly lesser quantities may be utilized when the platinum group is compounded with another active metal as for example, copper, nickel, chromium, etc.

Various inorganic refractory oxide base materials may be useful as catalyst supports in the preparation of the oxidizing catalyst, as for example, the widely used silica and alumina or silica-alumina support materials are generally preferred because of adaptability, relative economy, good physical characteristics, etc. For use with oxygen scavenging catalysts, prior associated work has shown that finely divided alumina, preferably less than 100 microns in size, is preferable for forming an active catalyst composite. Relatively fine particles of alumina may be prepared as microspheres by the spray drying technique where there is a spraying of an alumina hydrogel slurry into a heated drying and collecting chamber. In addition alumina precipitates in varying sizes may be prepared by adding ammonia to an aluminum salt solution, as, for example, aluminum chloride, aluminum nitrate, aluminum sulfate, etc. Also a commercial alumina, known as Alcoa C-31, has a particle size primarily less than 100 microns and appears to result in providing a quite satisfactory support material.

For oxidizing catalysts suitable for use in the treatment of exhaust gas streams from automobiles or from processing units emitting combustible volatiles, fumes, etc., the catalyst composite may comprise alumina spheres or pellets with palladium in an amount to provide from about 0.01% to 1% palladium by weight of the dry composite. Again various types of refractory base materials may be utilized to advantage, however, it may be found that one particle type of base material is preferred over another. For example, in converters for exhaust gas streams for autos it has been found that low density alumina having an apparent density less than about 0.5 gram per cubic centimeter is preferable, particularly for gases resulting from leaded fuels.

As used herein, the term "alumina" is intended to include porous aluminum oxide in the various states of hydration. However, in addition to alumina, an improved carrier may incorporate at least one other refractory inorganic oxide in conjunction with the alumina. For example, an oxide such as silica, or titania, zirconia, hafnia, baria, or a mixture of two or more of such oxides may be incorporated with the alumina. The addition or incorporation of any of these refractory inorganic oxides, with the alumina, is generally dependent upon the desire to add thereto certain physical and/or chemical characteristics. The added oxide, or oxides, may be present within the carrier material in an amount within the range of about 0.5% to about 20.0% by weight thereof. Intermediate quantities are preferred, and will be normally within the range of about 1.0% to about 10.0% by weight. The additional oxide, or oxides, may be effectively incorporated with the alumina by adding a water soluble salt of the component into the solution from which the alumina is precipitated. For example, titanium tetrachloride or zirconyl chloride may be added to the alumina sol prior to its dropping from the tips in the preparation of alumina spheres. However, the particular method employed for the manufacture of the alumina and other refractory material composited therewith, is not considered an essential feature of the present invention. The catalyst may take the form of any desired shape such as spheres, pills, extrudates, powder, granules, cakes, etc. The preferred form of support is the sphere, and spheres of the improved carrier of this invention may be continuously manufactured by the well known oil drop method, following the procedure described in U.S. Patent No. 2,620,514, issued to James Hoekstra. Regardless of the method of manufacturing the refractory inorganic oxide particles, such particles are generally subjected to specific aging treatments.

Where the metal oxide support or alumina is to be impregnated with palladium, then such component may be added to the carrier by commingling the latter with an aqueous solution of chloropalladic acid. Other water-soluble compounds of palladium, or of the other platinum group metal components may be utilized within the impregnating solution and may include, for example, ammonium chloroplatinate, platinous chloride, platinic chloride, dinitrito-diammino-platinum, etc. Where the catalyst is to contain added non-noble metallic components, the catalyst may be prepared by commingling water-soluble compounds of these comopnents, particularly the nitrates, sulfates, chlorates, chlorides, or carbonates and soaking the particles of the inorganic refractory oxide therein followed by heating to form the corresponding oxides of the metallic components. Although the precise means by which the metallic component is combined with the refractory material is not known, it is believed that it exists in some physical association or chemical complex therewith. Thus, the palladium may be present as such, or as a chemical compound or in physical association with the refractory inorganic oxide, or with the other catalytically active metallic components, or in some combination with both.

The catalytic impregnation may also be carried out in the presence of an additive component such as, for example, thiomalic acid, which appears to be effective in having the palladium impregnate the surface portion of the catalyst support whereby all of the activating component is available for carrying out the catalytic combination of the oxygen with the hydrogen. Varying amounts of thiomalic acid may be utilized; however, it has been found that about a 3 to 1 molar ratio of thiomalic acid to chloropalladic acid provides a desired form of surface impregnation.

Where the metal component is selected from the platinum-group, the same will be present in an amount within the range of about 0.05% to about 1.0% by weight thereof. As hereinabove stated, the metallic components may be incorporated in any suitable manner. Where platinum is employed, by reason of its being a preferred activating component, it may be added to the carrier material by commingling the latter with an aqueous solution of chloroplatinic acid. Other water-soluble compounds of platinum, or of the other noble metal components, may be utilized within the impregnating solution, and include ammonium chloroplatinate, platinous chloride, platinic chloride, dinitrito-diamino-platinum, etc. Where the catalyst is to contain other non-noble metallic components then, as noted for the palladium catalysts, the catalyst may be prepared by commingling water-soluble compounds of these components, particularly the nitrates, sulfates, chlorates, chlorides, or carbonates, and soaking the particles of the inorganic refractory oxide therein followed by heating to form the corresponding oxides of the metallic components. Other metallic components, either in conjunction with, or instead of, the platinum component, will be present in an amount of from about 0.01% to about 20.0% by weight. Lower concentrations are preferred, and lie within the range of about 1.0% to about 10.0% by weight, calculated as the oxides thereof.

With some oxidizing catalysts it may be desirable to have the platinum or active component impregnated in a manner so that the active layer is buried below the surface of the catalyst in order that there may be long life and stability to the catalyst composite under severe operating conditions. The deep impregnation may be obtained by effecting the soaking of the carrier material with the chloroplatinic acid or other impregnating solution in the presence of citric acid or other poly basic organic acid materials such as oxalic, malonic, succinic, glutaric, adipic, pimelic, malic, tartaric acid, etc., or mixtures thereof.

By way of setting forth a detailed procedure for preparing one active form of oxidation catalyst, there may be utilized the following steps or operations:

(1) Dissolve the desired quantity of palladium chloride in a mixture of water and hydrochloric acid at about 115° F. that will provide an approximate 10/1 molar ratio of chlorine to palladium. Once the palladium has dissolved, heat the solution to about 160° F. along with constant stirring and remove from the heat on reaching that temperature. The water is added in an amount to yield a solution concentration of not more than about 0.003 gram of palladium per cubic centimeter. It is to be noted that higher palladium concentrations may be used in the solution, but the activity of the finished catalyst may not be as high as that obtained from the 0.003 gram of palladium per cubic centimeter solution.

(2) Impregnate the alumina, silica-alumina or other oxide base with the solution and permit excess water to evaporate with heating at about 150° F. to 220° F. Generally, before impregnation, the metal oxide base will be calcined at a temperature in the range of from about 900° F. to about 1400° F. and preferably at about 1200° F. Continue drying under an air flow until the water content is down to about 8%, at which time air drying may be at about 300° F.

(3) Carry out continued drying and calcination under air on the dried catalyst for 1½ to 2 hours at about 850°

F., for example, an appropriate air flow has been found to be a 120 gas hourly space velocity.

(4) Reduce the temperature to about 400° F. and purge with nitrogen.

(5) Effect reduction of the catalyst in a zone maintained at about 240° F. and having a mixed gaseous stream of nitrogen and hydrazine. The latter is formed by having nitrogen bubble through an 18 to 40 weight percent hydrazine aqueous solution. The lower concentration of this range is preferable for handling purposes, and in addition is capable of fulfilling most reduction needs. This reducing gas stream is maintained in the zone of about 240° F. for at least about a one hour period of time with the gas hourly space velocity being of the order of 120. The temperature in the reducing zone is then increased to about 660° F. and nitrogen flow continued (without hydrazine) for about a one-half hour period.

(6) The reduced catalyst may then be cooled to room temperature.

The following comparative examples will illustrate that the present improved reduction step provides a resulting active catalyst highly acceptable for commercial use.

In order to check various catalyst samples for activity, a test procedure was worked out which utilized apparatus to determine oxygen concentration versus residence time in a test reactor receiving a standard gas blend of oxygen-hydrogen and nitrogen (2.0% $O_2$; 5.0% $H_2$ and balance $N_2$). Briefly, the test apparatus involves the use of a gas blend tank, a small reactor, and a Beckman Model 777 laboratory oxygen analyzer. The reactor is a small tubular glass unit about 2.0 centimeters long, with a 0.15 centimeter inside diameter, and has means to place a small piece of filter paper at each end thereof.

In the operation of the test unit, a sample of catalyst is placed in the reactor for a height of about 0.80 centimeter and gas flow from the gas blend tank is permitted to pass through the reactor unit to the analyzer at a rate of from 10 to 3 cc./min. After the oxygen concentration reaches equilibrium for at least 30 minutes, then the oxygen reading is taken. The activity of a catalyst is expressed with respect to a "standard" catalyst or "reference" catalyst. Thus, activity, $$A = \frac{t_r}{t_s} \times 100$$

where $t_r$=residence time for the reference catalyst, and $t_s$=residence time for the sample in question that is required, in each instance, to bring the gas blend to a certain equilibrium concentration. With some very active catalysts it is necessary to dilute them, for the purpose of testing, with an inert material (preferably the catalyst support) so that the $O_2$ equilibrium concentration will lie within the detector's sensitivity range.

Example I

In one test operation, a catalyst was prepared by impregnating fine silica-alumina micro-spheres (passing a No. 140 mesh) with palladium chloride to provide 0.50% palladium by weight of the finished catalyst. The silica-alumina particles were obtained from a spray-drying operation preparing fluid catalytic cracking catalyst, where the slurry mixture resulted in a 86% silica-14% alumina finished composite. The impregnation solution used hydrochoric acid and palladium chloride in amounts to provide a molar ratio of about 2.5 to 1 of chlorine to palladium and water in an amount to provide the resulting 0.50% Pd on the finished catalyst. The impregnated base was first dried and then calcined at 1094° F. for about 1½ hours. The calcination was followed by a hydrogen reduction for about 1½ hours at 932° F. A nitrogen purge steam was used on the catalyst preceding and following the hydrogen reduction step.

A portion of this catalyst was placed in the glass reactor described hereinbefore for use in testing catalyst activity and was subjected to contact with the standard gas blend used in the testing procedure. The resulting activity calculated after equilibrium was 100, or equal to a standard reference catalyst.

Example II

The catalyst used in this example had a silica-alumina base of fluid catalytic cracking catalyst of the same type as described for Example I; however, in this instance, the hydrochloric acid-palladium chloride impregnation solution was prepared to provide a resulting 10/1 molar ratio of chloride to palladium. After the impregnation the composite was dried and oxidized in the presence of air to a temperature of about 850° F. for about a one hour period and then cooled to about 175° F. during a two hour period. Also, in this instance, the resulting impregnated and oxidized composite was subjected to reduction in the presence of a nitrogen-hydrazine gas mixture (obtained by bubbling nitrogen through an 18% hydrazine aqueous solution) for about one hour at 240° F. The temperature was subsequently increased to 660° F. and hydrazine addition discontinued. Nitrogen flow was permitted for a further one-half hour period, then the catalyst was allowed to cool to room temperature.

Upon subjecting a sample of the present catalyst to the activity testing procedure, there was found a resulting initial activity of 2,432.

It thus appears, in accordance with the present reducing procedure, that, there can be a very satisfactory catalyst preparation in manner utilizing a reduction with a gas mixture of nitrogen and hydrazine at a temperature below 660° F. This reduction procedure, by eliminating the need of hydrogen at high temperature, generally yields a more stable catalyst as well as a procedure in which considerable less heat is consumed, and which provides somewhat safer working conditions.

I claim as my invention:

1. In the preparation of an oxidizing catalyst having an active component of a platinum group metal impregnated on sub-divided alumina containing base particles, the improvement which comprises drying the freshly prepared catalyst and effecting a final low temperature reduction of the dried catalyst at a temperature of about 242°±5° F. in the presence of a mixed gaseous stream of nitrogen and hydrazine.

2. In the preparation of an oxidizing catalyst having an active component of a platinum group metal impregnated on sub-divided alumina containing base particles, the improvement which comprises, effecting, after the impregnation of the active component, a drying of the catalyst and then a relatively low temperature reduction of the catalyst at a temperature of about 242°±5° F. in the presence of a mixed gaseous stream obtained by bubbling nitrogen through a solution of hydrazine.

3. In the preparation of an oxidizing catalyst having an active component of a platinum group metal impregnated on sub-divided base particles containing alumina, the improvement which comprises, effecting, after the drying and oxidation of the impregnated active component on base, the reducing of the thusly impregnated and dried composite in the presence of a mixed gaseous stream obtained by bubbling nitrogen through an 18% to 40% hydrazine aqueous solution at a temperature of the order of about 240° F., and then gradually increasing the temperature to the order of 660° F., and keeping the sample at this temperature under nitrogen alone for at least a one half hour period whereby to remove water content from the composite.

4. A method for eliminating oxygen from a confined zone by the formation of water in a hydrogen atmosphere, which comprises, contacting the gaseous mixture with a sub-divided oxidation catalyst which in turn has been prepared by impregnating a dried and calcined alumina containing base with palladium, drying the impregnated base, and subjecting the dried impregnated catalyst to reduction in the presence of a gaseous mixture of nitrogen and hydrazine at a temperature of about 242°±5° F.

5. A method for eliminating oxygen from a confined zone by the formation of water in a hydrogen atmosphere, which comprises, contacting the gaseous mixture with a subdivided oxidation catalyst which in turn has been prepared by impregnating a dried and calcined alumina containing base with palladium, drying the impregnated base, and subjecting the dried, impregnated catalyst to oxidation under air and then to reduction in the presence of a gaseous mixture of nitrogen and hydrazine obtained by bubbling nitrogen through an 18 to 40 weight percent hydrazine aqueous solution at a temperature of about 240° F., and then gradually increasing such temperature to about 660° F., keeping the sample at this temperature and under a nitrogen stream alone for at least about a one half hour period to effect water removal from the composite.

References Cited
UNITED STATES PATENTS

| | | | |
|---|---|---|---|
| 2,818,394 | 12/1957 | Haensel et al. | 252—466 |
| 3,123,491 | 3/1964 | Beaumont | 99—189 X |
| 3,161,605 | 12/1964 | Beck et al. | 252—460 X |
| 3,255,020 | 6/1966 | Ferrell | 99—189 |

OSCAR R. VERTIZ, *Primary Examiner.*

E. C. THOMAS, *Assistant Examiner.*

U.S. Cl. X.R.

99—189; 252—460, 466